United States Patent Office 3,247,258
Patented Apr. 19, 1966

3,247,258
METHYL-β-HYDROXYALKYL SULFOXIDES
Donald J. Anderson, San Anselmo, Calif., assignor to Chevron Research Company, a corporation of Delaware
No Drawing. Filed Oct. 25, 1961, Ser. No. 147,465
4 Claims. (Cl. 260—607)

This invention relates to the preparation of new compounds useful as lime soap dispersants and detergents. More particularly, the novel compounds of the present invention are of the non-ionic type. In a specific embodiment of the invention, detergent compositions containing said novel compounds are contemplated.

A number of compounds have been proposed as synthetic detergents of the non-ionic type. Non-ionic detergents are water-soluble without ionization. Water-solubility is achieved by a neutral organic hydrophilic group. Several types of non-ionic detergents are known. These contain a variety of hydrophilic groups. Some of the more common hydrophilic groups are those derived from polyethylene glycol; sugar alcohols, such as sorbitol or mannitol; di- and poly-saccharides, such as sucrose or dextrose.

In accordance with the present invention, the novel compounds can be represented by the following formula:

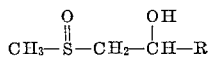

wherein R is an alkyl group of 6 to 14, preferably 10, carbon atoms. In general, compounds of the foregoing type can be prepared by the reaction of methyl mercaptan and oxygen with a 1-olefin of 8 to 16 carbon atoms, preferably 12 carbon atoms.

More specifically, it has been found that in order to obtain the desired compounds in good yields, certain conditions are required to be observed. Thus, when methyl mercaptan, olefin, and oxygen are contacted at a temperature below about 80° C., substantially no reaction occurs. On the other hand, when the temperature of reaction exceeds about 110° C. a number of undesirable side-reactions take place, with the result that the yield of desirable product is substantially negligible. Accordingly, for best results a temperature of reaction between about 90° C. and 100° C. is used.

Another critical feature involved in achieving yields in satisfactory amounts has to do with the method of carrying out the reaction. With certain olefins and mercaptans, such as indene, styrene, and thiophenol, reaction occurs by first mixing the olefin and mercaptan, oxygen being thereafter bubbled through the mixture. Or all of the reactants can be mixed simultaneously and agitated for a period of time sufficient to obtain the desired degree of reaction. As stated, these methods are satisfactory for reactions involving either active olefins or active mercaptans. But in order to prepare the presently contemplated compounds in good yields, it has been determined that oxygen, methyl mercaptan, and olefin be brought into contact at temperatures of the order of 90°–100° C., and in such manner that the additions of oxygen and the methyl mercaptan to the olefin take place simultaneously with the oxygen-mercaptan mol ratio being in the range 1:1 to 20:1.

One way of accomplishing the proper proportioning of reactants is to feed both oxygen and methyl mercaptan in the gaseous form through a gas inlet into the rapidly agitated solution of olefin and product maintained at the specified temperature. The reaction can be carried out either batchwise or in a continuous manner; in the latter case, unconverted olefin is easily separated from the product and recycled to the reaction zone.

The reaction of methyl mercaptan, oxygen, and appropriate 1-olefin usually occurs spontaneously at about 90° C. However, in the event it is desired to decrease any reaction induction period and thereby expedite reaction, initiation of the reaction can be effected by the use of a free radical initiator which decomposes with an appreciable rate at reaction temperatures, i.e., at about 90° C. Examples of such initiators are azobisisobutyronitrile, and methyl ethyl ketone peroxide.

Conveniently, the 1-olefin employed in the reaction is obtained by the cracking of petroleum wax or petroleum distillate, whereby a fraction of 1-olefins of essentially straight-chain structure having 8 to 16 carbon atoms can be obtained, the various molecular species being present in approximately equal molecular proportions. Further, if desired, various smaller fractions, including one of a substantially single molecular species, can be obtained within the $C_8$–$C_{16}$ range, as by distillation, to produce olefins of desired carbon content or molecular weight, such as a $C_{10}$–$C_{15}$ fraction, whereby mixtures of the desired compounds useful in detergent formulations can be obtained.

The following examples illustrate the preparation of the methyl-β-hydroxyalkyl sulfoxides contemplated:

EXAMPLE 1

*Preparation of methyl-β-hydroxydodecyl sulfoxide*

Dodecene-1 (168.3 grams, 1.0 mol) was heated to 95° C. in a turbo mixer to which was attached a reflux condenser cooled by Dry Ice in acetone. Oxygen was introduced into the vigorously stirred olefin at a rate of 1 liter per minute (2.7 mol/hr.). Simultaneously, methanethiol gas at room temperature was introduced at a rate of 750 ml. per minute (2 mols/hr.). Both gases were metered in through separated flow meters, and the cooled exit gas was vented through a single flow meter. After a few minutes an excess of methanethiol was indicated by the appearance of condensation in the Dry Ice condenser. The rate of addition of methanethiol was controlled such that a steady, slow reflux was maintained. After a total of 70 grams (1.46 mols) of liquid methanethiol had passed into the turbomixer, the reaction mixture was cooled and allowed to stand at room temperature for 12 hours. The precipitate which formed was separated by filtration and washed with three portions of 150 ml. of pentane each, to give a white crystalline powder, methyl-β-hydroxydodecyl sulfoxide, melting point 56.5°–70.0° C., 37 grams (28.3 percent based on dodecene consumed). Distillation of the filtrate and combined pentane washings yielded 79.5 grams of unchanged dodecene.

A portion of the β-hydroxy sulfoxide was recrystallized three times from acetone to yield an analytically pure sample, melting point 80.2°–84.1° C.

Elemental analysis for $C_{13}H_{28}O_2S$: Calculated: C, 62.85; H, 11.36; S, 12.91. Found: C, 62.55; H, 11.15; S, 12.99.

The amount of active hydrogen was determined by the Zerewitinoff method:

| | Hydrogen per mol |
|---|---|
| Calculated | 1.0 |
| Found | 0.96 |

The infrared spectrum (2 percent in carbon tetrachloride) showed strong maxima at 3320 cm.$^{-1}$ and 1030 cm.$^{-1}$. Adsorption at 3320 cm.$^{-1}$ is attributed to the hydroxyl group, and the adsorption at 1030 cm.$^{-1}$ is assigned to the sulfoxide group.

EXAMPLE 2

This example was performed in essentially the same manner as Example 1, except that the dodecene-1 (168.3 g.) was initially at a temperature of 35° C., and the oxygen and methanethiol were bubbled through at the rate of 2 liters and 1 liter per minute, respectively, and no reaction occurred. Therefore, the temperature was raised to 65° C. and the reactants bubbled through the olefin for an additional three hours. After cooling, an infrared spectra of the solution showed no absorption in the 1030 cm.$^{-1}$ region (S—O band), indicating that no sulfoxide was formed. The temperature employed was too low to effect reaction.

EXAMPLE 3

Dodecene-1 (250.5 g., 1.5 mols) was placed in a quartz flask and irradiated with an UV lamp. The oxygen and methanethiol were bubbled through at the rate of 400 and 200 ml. per minute, respectively. This was continued for three hours at room temperature. However, there was no reaction. The flask was then heated until the contents reached 95° C. The UV lamp was turned off as rapid absorption of methanethiol and oxygen began. After one hour, addition of reactants was stopped and the flask was cooled to room temperature. After standing for 18 hours, a white solid separated and was removed by filtration. This material was washed with pentane and then dried to give 50 g. of the desired methyl-β-hydroxydodecyl sulfoxide. This example shows that increasing the temperature to within the required temperature range brings about reaction.

EXAMPLE 4

Dodecene-1 (168.3 g., 1 mol) was placed in a 500 cc. round-bottom flask at 90° C. Oxygen and methanethiol were added at the rate of 1200 ml. per minute. After 1¼ hours the reaction suddenly became very exothermic, and the temperature rose to 140° C. An extremely rapid oxygen consumption occurred but only a slight increase in mercaptan consumption was observed. The flask was cooled and the temperature brought back to 90° C. After a total time of 2½ hours, addition of reactants was stopped and the solution cooled to room temperature. Analysis showed that essentially no desired product was formed. This example illustrates the adverse effect of too high a temperature.

EXAMPLE 5

*Preparation of methyl-β-hydroxyoctyl sulfoxide*

(a) *Preparation of 1-octene epoxide.*—A solution of trifluoroperacetic acid was prepared by adding 220 ml. of trifluoroacetic anhydride to 35 ml. of 90% $H_2O_2$ in 250 ml. of chloroform at 110° C. This solution was added slowly to 1-octene (112 g., 1 mol) in 500 ml. of chloroform containing 400 g. of sodium carbonate. The temperature was maintained at —5 to 0° C. When the addition was completed, the mixture was stirred for one-half hour, then heated to boiling for one hour. It was then cooled, filtered, and most of the chloroform removed by distillation. Analysis of the final solution showed the following composition: 1,2-epoxyoctane, 67.7%; 1-octene, 8.4%; chloroform, 23.9%.

(b) *Preparation of methyl-β-hydroxyoctyl sulfide.*—To the above prepared solution (125 g.) there was added a solution of sodium methyl mercaptan (40 g.) in 1000 cc. of ethanol at 10° C. When the mixing was complete, a 10 percent solution of hydrochloric acid in ethanol was added slowly to the mixture at 5° C. until the pH was 7. The precipitated salt was removed by filtration, and the ethanol was removed by distillation. The product containing solution was washed with water and then extracted with ether. After drying over potassium carbonate, the ether solution was distilled to give 80 ml. of product, boiling at 68°–76° C. at 0.1 mm. This material had a $n_D^{20}$ of 1.4721.

(c) *Preparation of methyl-β-hydroxyoctyl sulfoxide.*—To 50 ml. of glacial acetic acid there was added 11.4 g. of 30 percent $H_2O_2$. Then 18 g. of methyl-β-hydroxyoctyl sulfide in 400 ml. of acetic acid was carefully added with stirring, and while maintaining the temperature at 0–5° C. Dichloromethane, 150 ml., was added to prevent solidification. After 1½ hours the mixture was neutralized with sodium carbonate, extracted three times with 250 ml. portions of dichloromethane. The extracts were dried over magnesium sulfate and then distilled. In this manner there was obtained 10.7 grams of the desired product. This material was recrystallized from petroleum ether to give a compound melting at 37.2°–40.8° C. An infrared analysis showed strong absorption in the hydroxy (3320 cm.$^{-1}$) and sulfoxy (1030 cm.$^{-1}$) regions.

Elemental analysis for $C_9H_{20}O_2S$: Calculated: C, 56.21; H, 10.48; S, 16.67. Found: C, 55.57; H, 9.63; S, 16.47.

EXAMPLE 6

*Preparation of methyl-β-hydroxyhexadecyl sulfoxide*

This compound was prepared in essentially the same manner as that of Example 1, except that hexadecene-1 (224 g., 1.0 mol) was charged to the turbomixer and heated to 90° C. 10 milliliters of a 2 percent solution of azobisisobutyronitrile in acetone were added. Methanethiol was charged at the rate of 100 milliliters (about 0.005 mol) per minute until a total of 48 grams (1.0 mol) was added. Simultaneously, oxygen was introduced at the rate of 2 liters (0.1 mol) per minute. The period of addition was 2½ hours, after which time the contents were cooled and 32 grams of solid product were separated by filtration. This compound had a melting point range of 72.8°–78.1° C. An infrared spectrum showed adsorption at 3450 and 1035 cm.$^{-1}$ which is consistent with a β-hydroxy sulfoxide structure.

Elemental analysis for $C_{17}H_{36}O_2S$: Calculated: C, 67.05; H, 11.92; S, 10.53. Found: C, 67.04; H, 12.26; S, 10.35.

The methyl-β-hydroxyalkyl sulfoxide compounds of the present invention exhibit marked detergent properties. For example, this cleansing power can be shown in their ability to remove soil from dirty laundry when compounded with the builders ordinarily incorporated in household synthetic detergents.

To illustrate, detergent compositions based on 5 to 40 parts by weight of a suitable methyl-α-hydroxyalkyl sulfoxide and 60 to 95 parts by weight of a condensed inorganic phosphate detergent salt builder, or other inorganic salts, such as the alkali metal sulfates, carbonates, silicates, and borates, show excellent detergent properties.

A particularly useful composition is one based on a suitable β-hydroxyalkyl sulfoxide and a condensed phosphate ordinarily used in conjunction with a synthetic sufactant to poduce a heavy-duty detergent composition. The polyphosphates can be used in their commercially available anhydrous form, obtained by the high-temperature dehydration of the orthophosphates-tripolyphosphates, from a mixture of disodium orthophosphate and mono-orthophosphate; tetrasodium pyrophosphate, from disodium orthophosphate; and sodium polymetaphosphates, from orthophosphate. The various condensed phosphates can be used singly or in admixture. As is known in the detergent art, the proportions of the various phosphates are frequently altered in practice. Generally good results are obtained when sodium tripolyphosphate is essentially the sole condensed phosphate, or is admixed with the other condensed phosphate, for example, 80 percent tripolyphosphate and 20 percent pyrophosphate.

In addition to the detergent builder, other ingredients or fillers compatible with the β-hydroxyalkyl sulfoxide, in combined amounts up to about 30 weight percent of the final composition, can be incorporated. Examples of compatible optional ingredients are those customarily present in heavy-duty detergent formulations. These include in weight amounts based on final composition, an anticorrosion and stabilizing agent, such as sodium silicate, wherein the $SiO_2$ to $Na_2O$ ratio can range from 1/2 to 2/1 in proportion of, for example, 5 percent; an antiredeposition agent, such as carboxymethyl cellulose, as described, for example, in U.S. Patent No. 2,568,334, proportions of about 1 to 3 percent being cited as illustrative; a foam modifier, such as a mono- or diethanolamide of a fatty acid, such as lauric isopropanolamide, in proportions, for example, of 5 percent; a chemical bleaching agent such as sodium perborate or sodium percarbonate, for example, in an amount of 2 to 5 percent; optical whiteners, in amounts of the order 0.1 to 0.2 percent, such as the triazinyl and aroylstilbene, such as benzidinesulphones, bisbenzimidazoles, triazoles, and amino coumarins; sequestering agents, in amounts, for example, of the order of less than one percent, such as tetrasodium ethylene diamine tetraacetic acid.

For the purpose of determining the soil-removing properties of the compositions hereinbelow appearing, a Terg-O-Tometer test, as described in "Detergency Evaluation and Testing" by J. C. Harris, Interscience Manual 4, Interscience Publishers, Inc. N.Y., was used. In essence, this test involves the washing of cotton swatches, soiled with a common soil, in water of predetermined hardness at 120° F. for 10 minutes. After washing, the swatches are rinsed and then dried. The effectiveness of each composition is measured by comparing the whiteness of the washed swatches to the whiteness of a good and a poor standard, thereby obtaining a relative detergency range upward from 0.

In the tabulated experiments the formulations were used in the indicated concentrations and were made up of 20 percent of the indicated detergent material, 50 percent sodium tripolyphosphate, 5 percent sodium silicate, 1 percent carboxy methyl cellulose, and 24 percent sodium sulfate. Water having a hardness of 50 p.p.m. was employed (calcium and magnesium salts in the ratio of 2 parts calcium chloride to 1 part magnesium chloride, calculated as the carbonate, in de-ionized water).

RELATIVE DETERGENCY BY THE TERG-O-TOMETER TEST

| Compound | Concentration | | | |
|---|---|---|---|---|
| | 0.05 | 0.10 | 0.15 | 0.20 |
| Methyl-β-Hydroxydodecyl Sulfoxide | 1.8 | 4.8 | 4.9 | 5.0 |
| Methyl-β-Hydroxyhexadecyl Sulfoxide | 1.7 | 2.1 | 2.4 | 2.7 |
| Methyl-β-Hydroxyoctyl Sulfoxide | 0.6 | 1.0 | 1.1 | 1.1 |

From the tabulated data it is apparent that the species methyl-β-hydroxydodecyl sulfoxide gives by far the best results and, hence, should be regarded as the preferred material. Indeed, this compound is even generally superior to well-known detergents, such as the nonionic polyethylene glycol-nonyl phenol and the anionic polypropylene benzene sulfonate detergent. When subjected to the Terg-O-Tometer test, as above described, the nonionic detergent gave values of 3.3, 3.6, 3.7, and 3.8, and the alkylbenzene detergent, 0.4, 0.8, 4.2, and 4.4 at concentrations, respectively, of 0.05, 0.10, 0.15, and 0.20.

I claim:
1. The compounds having the formula

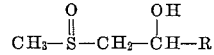

wherein R is an alkyl group of 6 to 14 carbon atoms.
2. Methyl-β-hydroxyoctyl sulfoxide.
3. Methyl-β-hydroxydodecyl sulfoxide.
4. Methyl-β-hydroxyhexadecyl sulfoxide.

References Cited by the Examiner
UNITED STATES PATENTS

| | | | |
|---|---|---|---|
| 2,859,248 | 11/1958 | Louthan | 260—607 |
| 2,990,375 | 6/1961 | Steinhauer et al. | 252—138 |
| 3,000,831 | 9/1961 | Tuvell | 252—138 |
| 3,005,852 | 10/1961 | Freyermuth et al. | 260—607 |
| 3,045,051 | 7/1962 | Coma et al. | 260—607 |

CHARLES B. PARKER, *Primary Examiner.*

JULIUS GREENWALD, *Examiner.*

Notice of Adverse Decision in Interference

In Interference No. 95,835 involving Patent No. 3,247,258, D. J. Anderson, Methyl-β-hydroxyalkyl sulfoxides, final judgment adverse to the patentee was rendered Oct. 21, 1968, as to claim 3.

[*Official Gazette March 11, 1969.*]